United States Patent [19]  [11] 4,344,319
Hancock et al.  [45] Aug. 17, 1982

[54] PIPE JOINT SEALED TEST METHOD

[76] Inventors: Dane R. Hancock, 516 Bontona Ave., Fort Lauderdale, Fla. 33301; Burgess F. Rand, 2621 SW. 15th Ct., Fort Lauderdale, Fla. 33315

[21] Appl. No.: 128,278

[22] Filed: Mar. 7, 1980

[51] Int. Cl.³ .............................................. G01M 3/28
[52] U.S. Cl. .................................... 73/40.5 R; 73/49.1
[58] Field of Search .................... 73/40.5 R, 46, 49.1, 73/49.5; 138/90

[56] References Cited

U.S. PATENT DOCUMENTS 3,012,433  12/1961  Blafield ............................ 73/49.1 X
4,103,537  8/1978  Victor ............................... 73/49.1 X

FOREIGN PATENT DOCUMENTS 55-74436  6/1980  Japan .............................. 73/40.5 R Primary Examiner—Stuart S. Levy
Assistant Examiner—Joseph W. Roskos
Attorney, Agent, or Firm—Eugene F. Malin

[57] ABSTRACT

Methods for testing the sealing integrity of seals of joints being added to an underwater pipe string and of each previously laid joint in the pipe string each time a joint is added to the string. The seal testing methods can be accomplished in two ways; dynamically, by pumping the sealed pipe until flow stops if the seal is perfect; or statically, by sealing the pumping unit discharge and measuring the pressure in the sealed pipe.

2 Claims, 6 Drawing Figures

PIPE JOINT SEALED TEST METHOD

BACKGROUND OF THE INVENTION

Some of the greatest problems of laying pipe under water are making good seals between pipes in a string of pipe, testing the seals, and moving the bulkheads under the water. Also controlling the amount of pressure differential between the inside and outside of the pipe as not to exceed the design limits of the pipe. An improvement in the method of laying pipes under water is our U.S. Pat. No. 3,952,524, where the incompressability of water is used to help make better connections between adjacent pipes in a string of pipes. The present invention improves still further on that method by providing means to test just how good the joint seals are, easing the burden of moving the bulkhead under the water, and controlling the maximum pressure differential imposed on the pipe.

SUMMARY OF THE INVENTION

Methods for testing the sealing integrity of seals of joints between an underwater pipe string and pipes being added and of each previously laid joint in the pipe string and means of controlling the buoyancy of a bulkhead and the finite differential pressure between a submerged pipe and the surrounding water. The method of testing the integrity of the seals in the underwater pipe string can be accomplished dynamically by trying to pump out the pipe string which is sealed at the other end; if the seals are good, flow across the pump will be zero, but if a seal is bad, the flow across the pump will continue. This test can also be accomplished statically by placing a sealing plate across the pumping unit discharge to seal it. The pumping unit is then shut off and a vacuum gauge connected to the bulkhead interior is monitored. If the pressure differential does not change in a reasonable time, all the joints in the pipe line are good. If the pressure differential decreases, a joint or joints are not completely sealed. From this pressure change, the amount of leakage can be computed.

The means of controlling the buoyancy of the bulkhead consists of a hollow area in the bulkhead with an air inlet/outlet aperture and a water inlet/outlet aperture. The buoyancy of the bulkhead is controlled by adding more air or water, depending on the amount of buoyancy needed. When the bulkhead has the right buoyancy it can be moved about as if it were almost weightless, thus eliminating the need for a crane or other lifting device.

The means of finite differential pressure control comprises an aperture through the bulkhead with a compensated release door on one end, the release door can be preset to trip at any predetermined pressure to maintain a maximum pressure differential between the pipe interior and exterior. This differential may be positive or negative, depending upon orientation of the release mechanism.

An object of the present invention is to provide a method of testing the integrity of seals between pipes in a pipe string.

Another object of the present invention is to provide a means of controlling the buoyancy of a bulkhead to facilitate its movement underwater.

A further object of the present invention is to provide a means of maintaining a maximum positive or negative pressure differential between the inside and outside of a pipe.

In accordance with these and other objects which will be apparent hereinafter, the instant invention will now be described with particular reference to the accompanying drawings.

DESCRIPTION OF THE PREFERRED EMBODIMENT

Figure 1:
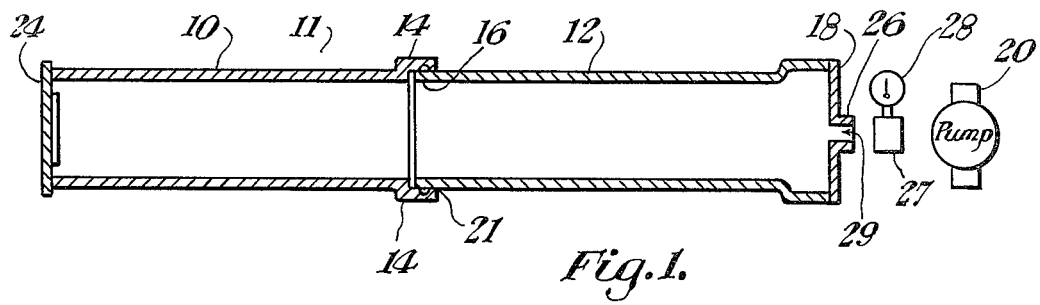
FIG. 1 is a cross-sectional side view of two joined and sealed pipes illustrating bulkheads.

Referring to FIG. 1, two pipes are shown after the joint and seal between them have been made. Pipe 10 has been connected to pipe 12 by means of the female end 14 of pipe 10 and the male end 16 of pipe 12. The other end of pipe 10 is sealed by bulkhead 24. Bulkhead 24 may be a solid one piece bulkhead. To determine if the seal of the joint between pipes 10 and 12 is good, the pump 20 is used to create a lower pressure in both pipes relative to the outside pressure of the water 11. The outside pressure is the water pressure on the pipe which is the pressure below the surface of the water. The pump 20 is connected to conduit 27 that is connected to opening 29 in bulkhead 18. The pump 20 moves water out through opening 29 in the bulkhead pipe 26. If the flow through opening 29 and the pump 20 as measured by flow-meter 28 connected to the opening in pipe 27 is zero after a reasonable time after the pump 20 is activated, the seal is good. If the flow continues, however, the seal is no good because matter such as water continues to come into the interior of the pipes through the joint between them, such as indicated by numeral 21.

Figure 2:
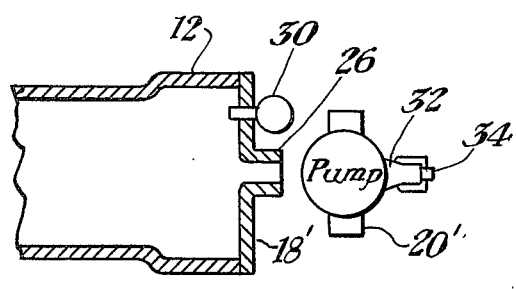
FIG. 2 is an enlarged view of the right bulkhead in FIG. 1 with a pumping unit.

Now referring to FIG. 2, showing pipe 12 with bulkhead 18' attached, another way of determining if the seal of the joint between the two pipes is good is by sealing the discharge 32 of the pump 20, after it is connected to bulkhead pipe and after it is run for a time period, with sealing plate 34 and shutting off the pumping unit and monitoring the vacuum gauge 30 which is connected to and through the bulkhead 18, to monitor the internal pressure. If the pressure differential does not change in a reasonable time, the seal is good. If the pressure differential decreases, the seal is not good. The testing procedure can be repeated each time a joint is added to the string of pipes on a line. Testing is independent of pipe line length or number of joints.

Figure 3:
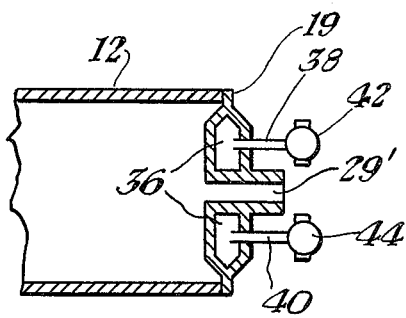
FIG. 3 illustrates another bulkhead in place of the bulkhead shown in FIG. 2.
Figure 4:
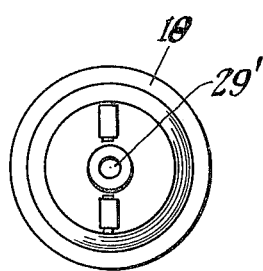
FIG. 4 is an end view of the bulkhead shown in FIG. 3.

Referring to FIGS. 3 and 4, the bulkhead 19 is shown with opening 29' and with a cavity 36 in it into which water can be added by valve 44 through opening 40. The water can also be drained out through opening 40. Air may be added in through hole 38 through valve 42 from air supply not shown. By controlling the amounts of air and water that are in chamber 36, the buoyancy of the bulkhead 18 can also be controlled. The right buoyancy can make bulkhead 18 very easy to move underwater since it will be virtually weightless. Such a bulkhead is an advantage when tests are performed and each additional length of pipe is connected to the string.

Figure 5:
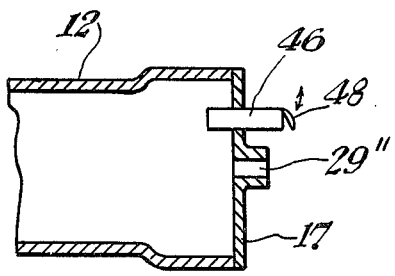
FIG. 5 is a cross-sectional side view of a bulkhead with pressure release door.
Figure 6:
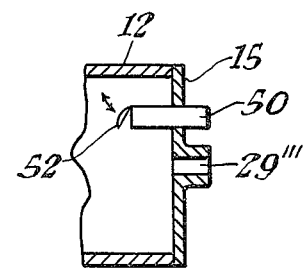
FIG. 6 is a cross-sectional side view of a bulkhead with another pressure release door.

Now referring to FIGS. 5 and 6, bulkheads 17 and 15 have openings 29" and 29'" respectively. Bulkheads 17 and 15 have an aperture through the bulkhead in pipes or conduits 46 and 50 respectively. The conduits have a pressure compensated release door 48 and 52 at one end. The differential may be positive or negative, depending on the orientation of the release mechanism. FIGS. 5 and 6 show two differential orientations of the release mechanism for providing automatic compensation for pressure in one direction or another.

The various items disclosed may be used in various combinations.

The instant invention has been shown and described herein in what is considered to be the most practical and preferred embodiment. It is recognized, however, that departures may be made therefrom within the scope of the invention and that obvious modifications will occur to a person skilled in the art.

What we claim is:

1. A method of quickly testing the sealing integrity of pipes layed in a pipe string underwater by utilizing a pump in a bulkhead to connect one to the other comprising the steps of:

connecting a pump and bulkhead to the open end of the pipe string;
pumping liquid from within said pipe string creating a pressure differential between the pressure within said pipe string and the pressure outside of said pipes,
measuring the flow from within said pipes through said pump for a reasonable period of time,
detecting zero displacement of liquid from said pump by monitoring said flow to determine a zero flow rate through said pump to test for good sealing integrity.

2. A method of testing the sealing integrity of pipe fittings in a pipe string in a incompressible liquid environment wherein the unchanged static pressure within the pipe indicates a good seal comprising the steps of:

sealing a pipe string,
attaching a pump means to said pipe string,
attaching a vacuum gage to said pipe string,
displacing said incompressible liquid from within said pipe string by use of said pump means for creating a vacuum in said pipe string,
sealing said pump means,
monitoring said vacuum gage to determine zero change in the pressure in said pipe string to indicate a good pipe fitting seal.

* * * * *